(12) United States Patent
Masaki

(10) Patent No.: US 7,305,566 B2
(45) Date of Patent: Dec. 4, 2007

(54) OUTPUT SYSTEM AND OUTPUT METHOD USED IN THE SAME FOR PRINTING AND PRODUCING COPIES

(75) Inventor: Kenji Masaki, Nagaokakyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 747 days.

(21) Appl. No.: 09/753,601

(22) Filed: Jan. 4, 2001

(65) Prior Publication Data

US 2001/0006551 A1   Jul. 5, 2001

(30) Foreign Application Priority Data

Jan. 4, 2000   (JP)   ............................. 2000-000073
Nov. 22, 2000  (JP)   ............................. 2000-355968

(51) Int. Cl.
*G06F 11/30*  (2006.01)
*G06F 9/44*   (2006.01)
*G06F 17/30*  (2006.01)

(52) U.S. Cl. .............................. 713/189; 726/1; 726/2; 726/3; 726/6; 726/26; 726/27; 726/32; 726/33; 719/321; 719/327; 719/328; 380/201; 380/202; 380/203

(58) Field of Classification Search ........ 713/164–165, 713/200–202, 189; 709/220–226, 229; 380/201–203; 358/1.14; 399/366; 382/34; 719/321, 327–328, 719/330; 726/1–3, 6, 21, 26–27, 32–33

See application file for complete search history.

(56) References Cited

U.S. PATENT DOCUMENTS

| 5,581,613 | A  | * | 12/1996 | Nagashima et al. | ........ 380/201 |
| 6,362,893 | B1 | * | 3/2002  | Francis et al. | ............. 358/1.14 |
| 6,490,049 | B1 | * | 12/2002 | Cunnagin et al. | .......... 358/1.13 |
| 6,545,767 | B1 | * | 4/2003  | Kuroyanagi | ................ 358/1.14 |
| 6,598,087 | B1 | * | 7/2003  | Dixon et al. | ................. 709/236 |
| 6,618,566 | B2 | * | 9/2003  | Kujirai et al. | ................. 399/79 |
| 6,687,017 | B1 | * | 2/2004  | Kakiuchi et al. | ........... 358/1.14 |

* cited by examiner

*Primary Examiner*—Taghi Arani
*Assistant Examiner*—Jenise Jackson
(74) *Attorney, Agent, or Firm*—Buchanan Ingersoll & Rooney PC

(57) ABSTRACT

An output system having a data processor and an printer or other output device for outputting data in a specific format, which is sent from the data processor, to which is installed driver software for controlling the output device. Whether the data on output request passes the driver software is determined in sending data to the output device. Data are prohibited from being sent to the output device for output requests on which data bypasses the driver software.

5 Claims, 11 Drawing Sheets

OUTPUT SYSTEM AND OUTPUT METHOD USED IN THE SAME FOR PRINTING AND PRODUCING COPIES

This application is based on applications Nos. 2000-73 and 2000-355968 filed in Japan, the contents of which is hereby incorporated by reference.

FIELD OF THE INVENTION

The present invention relates to an output system and output method used in the same for printing and producing copies.

BACKGROUND OF THE INVENTION

In recent years, improvements in performance and cost reductions for color copiers, color printers, and color scanners have contributed to creating an environment in which high quality illegal documents and copies, including paper currency, negotiable securities, and even gift certificates, can be easily created.

Data flow in a typical output system according to the related art is shown in FIG. 11. This output system comprises a computer 50 and a printer 60 connected to the computer 50. The computer 50 includes an operating system (OS) 52 and hardware 55 that operates according to control data from the OS 52. The OS 52 provides the computer 50 with various functions, including the abilities to display information on a screen, and create and store documents.

The OS 52 includes printer driver software ("printer driver" below) 53 for printer control independently of the operating system kernel, and a part of OS 52 is provided for an application programming interface (API) 54. The API 54 provides an interface to access operating system functions under the OS 52, in response to various requests from application programs ("APPLICATION A" and "APPLICATION B" in FIG. 11)

There are generally two methods used to print in an output system having a computer controlled by a general-purpose operating system. In one method, shown in FIG. 11 as printing from APPLICATION A, the printer driver 53 and API 54 are sequentially called in response to a print request from the application program, and the print data is generated by the printer driver 53 and sent to the printer I/O interface 56 of the hardware 55. The other method, shown as printing from APPLICATION B, does not use the printer driver 53 to generate the print data, but rather sends data from the application program through the API 54 directly to the printer I/O interface 56 of the hardware 55.

The conventional method for preventing illegal printing and copying in such an output system has been to build an illegal printing/copying prevention function into the printer driver 53. With the output system described above, however, this function can be easily bypassed. That is, if the processing content on printer 60 is decrypted by analyzing data output from computer 50, for example, if the data to be printed is compressed on computer 50 and then expanded on printer 60 and so on, printer 60 can be directly accessed by the application programs without using printer driver 53 to generate the print data. Therefore, illegal printing and copying cannot be prevented using this print route.

It should be noted that color copier is bound to equip an illegal printing/copying prevention function today. The means for implementing this function is generally provided in the form of hardware, and an increase in product cost is therefore unavoidable.

Furthermore, when an illegal printing/copying prevention function is provided as a hardware component on the printer side in a system including plural computers and plural printers accessible to the plural computers via a LAN or other network, the same hardware must be disposed to each individual printer. This is wasteful and unnecessarily expensive.

An object of the present invention is to provide a low cost, secure output system and output method used in the same, and a data storage medium storing a program run on this output system.

SUMMARY OF THE INVENTION

To achieve the above object, a first aspect of the present invention provides an output system having a data processing device and an output device for outputting data in a specific format, which is sent from the data processing device. In this output system, driver software which can control the output device is included in the data processing device. The output system comprises a first controller for determining whether data on output request passes the driver software, in sending data to the output device from the data processing device, and a second controller for prohibiting data from being sent to the output device for output requests on which data bypasses the driver software.

A further aspect of the present invention provides an output system having a data processing device and an output device for outputting in a specific format data sent from the data processing device. In this output system, driver software for controlling the output device is included in the data processing device. The output system comprises an encryptor for encrypting data passing the driver software, provided on the data processing device, and a decrptor for decrypting data encrypted by the encryptor, provided on the output device.

A yet further aspect of the present invention provides an output system having a data processing device and an output device for outputting data in a specific format, which is sent from the data processing device. In this output system, driver software having an illegal printing prevention function and controlling the output device is included in the data processing device. The output system comprises a prohibiting controller for prohibiting data output to the output device by setting a value which is different from an ordinary value for outputting data to the output device, in response to a data output request to the output device from the data processing device. The value that is thus set can be stored to a specific register.

A yet further aspect of the present invention provides an output method used in an output system having a data processing device and an output device for outputting data, in a specific format, which is sent from the data processing device. The output method comprises; determining whether data on output request passes driver software incorporated in the data processing device, which can control the output device, in sending data to output device from the data processing device, and prohibiting data from being sent to output device for the request on which data bypasses the driver software.

A yet further aspect of the present invention provides an output method used in an output system having a data processing device and an output device for outputting data in a specific format, which is sent from the data processing device. The output method comprises; encrypting data passing the driver software included in the data processing device, on the data processing device side, and decrypting the encrypted data, on the output device side.

A yet further aspect of the present invention provides a computer-readable storage medium for storing a program run on an output system having a data processing device and an output device for outputting data in a specific format, which is sent from the data processing device. The program comprises steps of; determining whether data on output request passes driver software incorporated in the data processing device, which can control the output device, in sending data to output device from the data processing device, and prohibiting data from being sent to output device for the request on which data bypasses the driver software.

A yet further aspect of the present invention provides a computer-readable storage medium for storing a program run on a data processing device which sends data to an output device for outputting data in a specific format. The program comprises steps of; encrypting an output data from an application program run on the data processing device, and outputting the encrypted data to the output device. The encrypting step in this case can set a specific password to the output data from the application program.

A yet further aspect of the present invention provides a computer-readable storage medium for storing an installer program to install the driver software for making an output device available to a data processing device which sends a data to the output device for outputting data in a specific format. The installer program comprises steps of: installing the driver software to the data processing device, and installing a program for prohibiting data on output request from being sent to the output device, for request on which data bypasses the driver software.

BRIEF DESCRIPTION OF THE DRAWINGS

Other objects and attainments together with a fuller understanding of the invention will become apparent and appreciated by referring to the following description and claims taken in conjunction with the accompanying drawings wherein:

DETAILED DESCRIPTION OF THE PREFERRED EMBODIMENTS

The preferred embodiments of the present invention are described below with reference to the accompanying figures.

Embodiment 1

Figure 1:
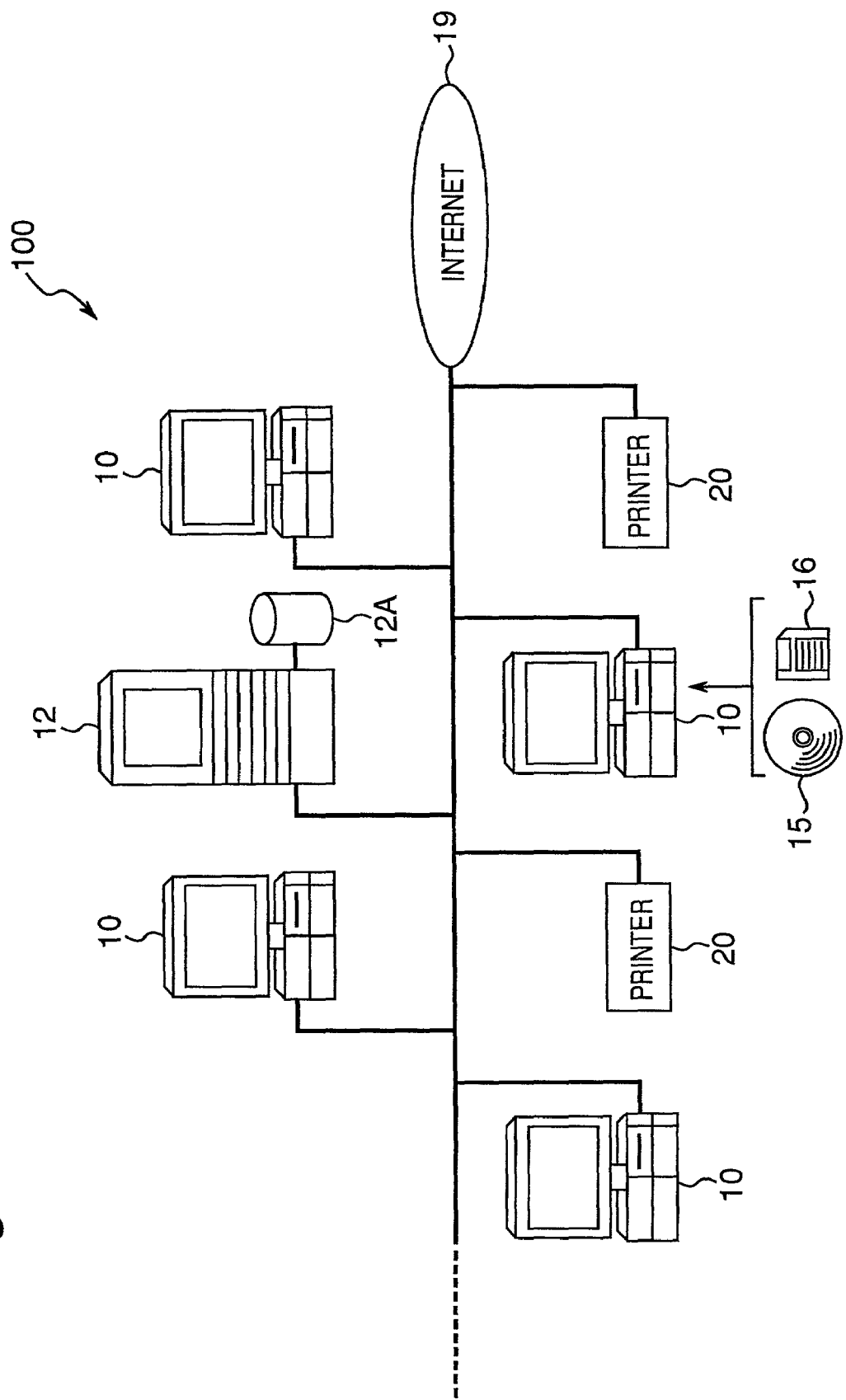
FIG. 1 is a schematic diagram of a network system incorporating an output system according to a first preferred embodiment of the present invention.

FIG. 1 is a schematic diagram of a network 100 incorporating an output system according to a first preferred embodiment of the present invention. This network 100 includes a server computer 12 for overall network control and management, and handling such jobs as searching for files requested from other network components; a plurality of client computers 10; and printers 20 for printing and producing hard copy output of data sent from a client computer 10. The server computer 12 contains a database 12A for systematically managing data. The client computers 10 can access the database 12A as needed to read and write information.

Figure 2:
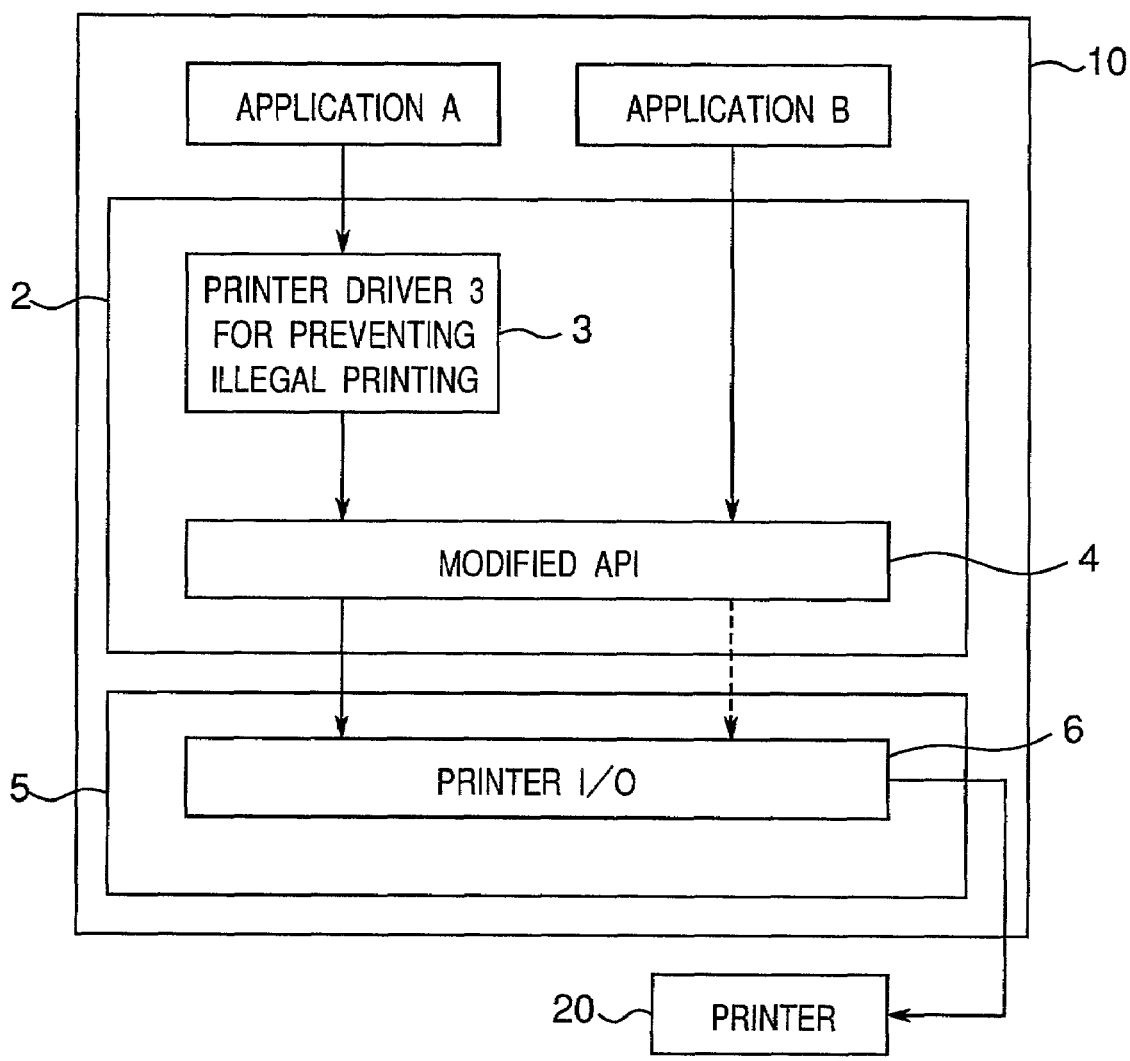
FIG. 2 is a schematic diagram of the output system in FIG. 1.

As shown in FIG. 2, each client computer 10 contains an operating system ("OS" below) 2 controlling basic client computer functions, and hardware 5, the operation of which is based on control data from the OS 2.

The network 100 is connected to the Internet 19, for example, so that the various client computers 10 can transfer files by way of e-mail and FTP (File Transfer Protocol), view home pages on the World Wide Web, download data from such Web pages, and utilize other available functions and features. In this exemplary embodiment of the invention, the OS 2 used on the client computer 10 is Microsoft Windows (R). It will be obvious to one with ordinary skill in the related art, however, that the invention shall not be so limited and another general purpose operating system such as Unix or MS-DOS (R) can be used.

In order to prevent illegal printing and copying when data is sent from a client computer 10 to a printer 20, the output system according to this preferred embodiment consisting of at least one client computer 10 and printer 20 connected thereto can prevent illegal job data from being sent to the printer, or can prohibit job output on the printer 20. This output system is further described below.

FIG. 2 shows a configuration of an output system comprising a client computer 10 and a printer 20. The OS 2 provides the client computer 10 with certain functions, including the abilities to display data on a screen and store and manage documents. Independently of the kernel, the OS 2 also has a plurality of device drivers, which are software programs for controlling a particular hardware component. One of these device drivers is a printer driver 3 installed which can control printer 20.

The printer driver 3 is installed to client computer 10 using an external data storage medium such as a CD-ROM 15 or floppy disk 16, which is generally bundled with the printer on its purchase. For install of the printer driver 3, the installer program is normally provided, which can automatically or semi-automatically installs the printer driver 3 according to the user's objectives. This installer program installs the printer driver 3 from an external data storage medium such as a CD-ROM 15 or floppy disk 16 to the client computer 10.

Figure 11:
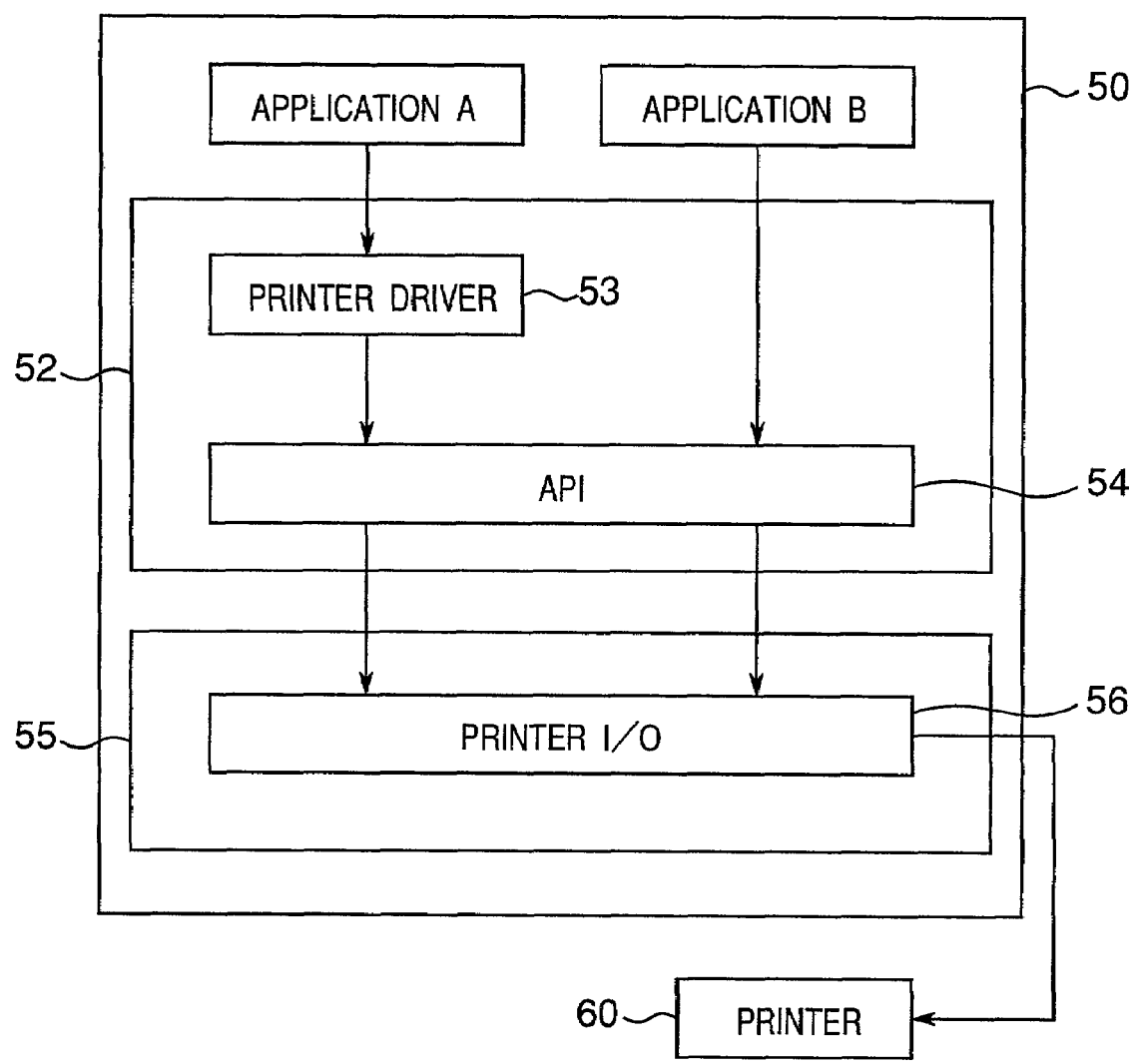
FIG. 11 is a schematic diagram of an output system according to the related art.

A part of OS 2 is provided for an application programming interface ("MODIFIED API" in FIG. 2) 4 through which printing functions under OS 2 are called in response to a print request from an application program ("APPLICATION A" and "APPLICATION B" shown in FIG. 2). In this first embodiment of the invention, this API 4 is the replacement by the previously installed API whereby an application program can directly access a printer (as in the related art example shown in FIG. 11). Though described more fully with reference to FIG. 3, this API 4 disables the ability to bypass the printer driver 3 and send data directly to printer 20, and thus prohibits sending data directly to the printer 20 through the API 4.

API 4 is installed to the client computer 10 using CD-ROM 15 or floppy disk 16 when installing the printer driver 3. When API 4 is installed, the original API resident in the OS 2 is either overwritten so that it is no longer present on disk, or is moved or renamed as a backup file. Thus, the newly installed API 4 is thus always called in response to a print request from APPLICATIONS A and B under the OS 2 shown in FIG. 2.

For example with Windows (R) as OS 2, the API 4 is provided as a DLL file. In this case, when API 4 is installed, the original DLL file is overwritten by the newly installed DLL file.

Under OS 2 thus comprised, when an application issues a print request, printer driver 3 is first called in response to the print request and then API 4 is called. The API 4 detects whether the data supplied thereto passes printer driver 3. If the API 4 detects that, printer driver 3 generates the print data. The data is then input to the printer I/O section 6 built into the hardware 5, converted for transmission to the printer 20, and then sent to the printer 20.

As known from the related art, the printer driver 3 can prevent illegal printing when generating the print data for printing, and can refuse access to the printer 20 when illegal job data is received. Printer 20 access is thus refused for illegal data when the data passes the printer driver 3, and illegal printing can thus be prevented.

When the data does not pass the printer driver 3, that is, when the data bypasses the printer driver 3, API 4 function calls (referred to as "API calls" below) are trapped and replaced by a separate routine in this OS 2. The ability to send data directly to the printer bypassing the printer driver is thus disabled, and sending data directly to the printer 20 through the API 4 is prohibited. In result, illegal data is refused access to the printer 20, and illegal printing is prevented even when the printer driver is bypassed.

Figure 3:
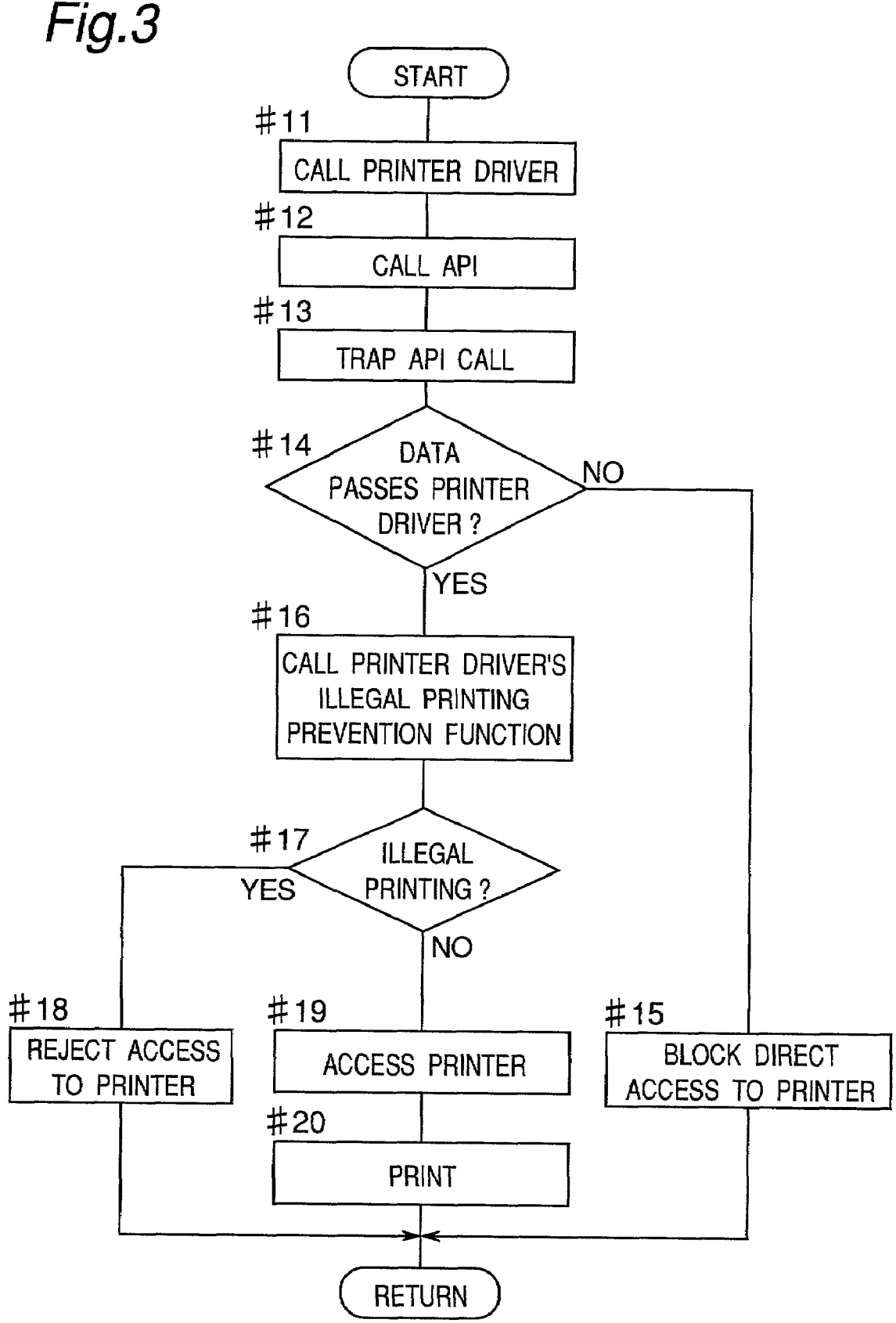
FIG. 3 is a flow chart of the illegal printing prevention operation of the output system in FIG. 1.

FIG. 3 is a flow chart of the illegal printing prevention process in the output system according to this preferred embodiment.

When an application program issues a print request, the printer driver 3 is called (#11) and the API 4 is called (#12). API calls indicating a print request are trapped (#13). In step #14, it is determined, based on the API call, whether a data path through printer driver 3 is requested. If the data is not sent through printer driver 3, the procedure advances to step #15 to prohibit direct access to the printer 20, and the process ends.

On the other hand, if the data is sent through printer driver 3, the procedure advances to step #16.

In step #16, the illegal printing prevention function incorporated into printer driver 3 is then called. In step #17, it is determined whether illegal printing is requested, that is, whether the data to be printed is illegal data. If illegal printing is requested, the procedure advances to step #18, printer access is rejected, and the process ends. On the other hand, if illegal printing is not requested, the procedure advances to step #19 and the printer 20 is accessed. The printer 20 then prints the data (#20), and the print job is output.

Thus, an output system according to the first embodiment can prevent illegal printing both when print data is sent through the printer driver 3 and when print data bypasses printer driver 3. This illegal printing prevention operation is achieved by an OS 2 program incorporated into client computer 10, in this first embodiment of the invention, this program is installed to the hard disk of a client computer 10 and read into memory for execution. The invention will obviously not be so limited, however, as the program can be stored, in file format, in the external data storage medium such as floppy disk, CD-ROM, and called therefrom.

As will be known from the preceding explanation, this first preferred embodiment of the invention achieves an output system that can prevent illegal printing with high reliability and at a low cost using software, and thus does not incur additional hardware costs. Furthermore, because the illegal printing prevention technology is built into printer driver 3, updating the printer driver is simple. It is therefore simple to modify the printer driver to keep the illegal printing prevention technology current with new types of illegal printing data such as when new currency is introduced.

Furthermore, in this first preferred embodiment, the printer driver 3, printer driver installer, and API 4 are described as installed to the client computer 10 using the external data storage medium such as CD-ROM 15, floppy disk 16. The invention will again not be so limited, however, as the printer driver can obviously be downloaded and installed using another computer by way of the LAN or other network to which the client computer 10 is connected.

Figure 4:
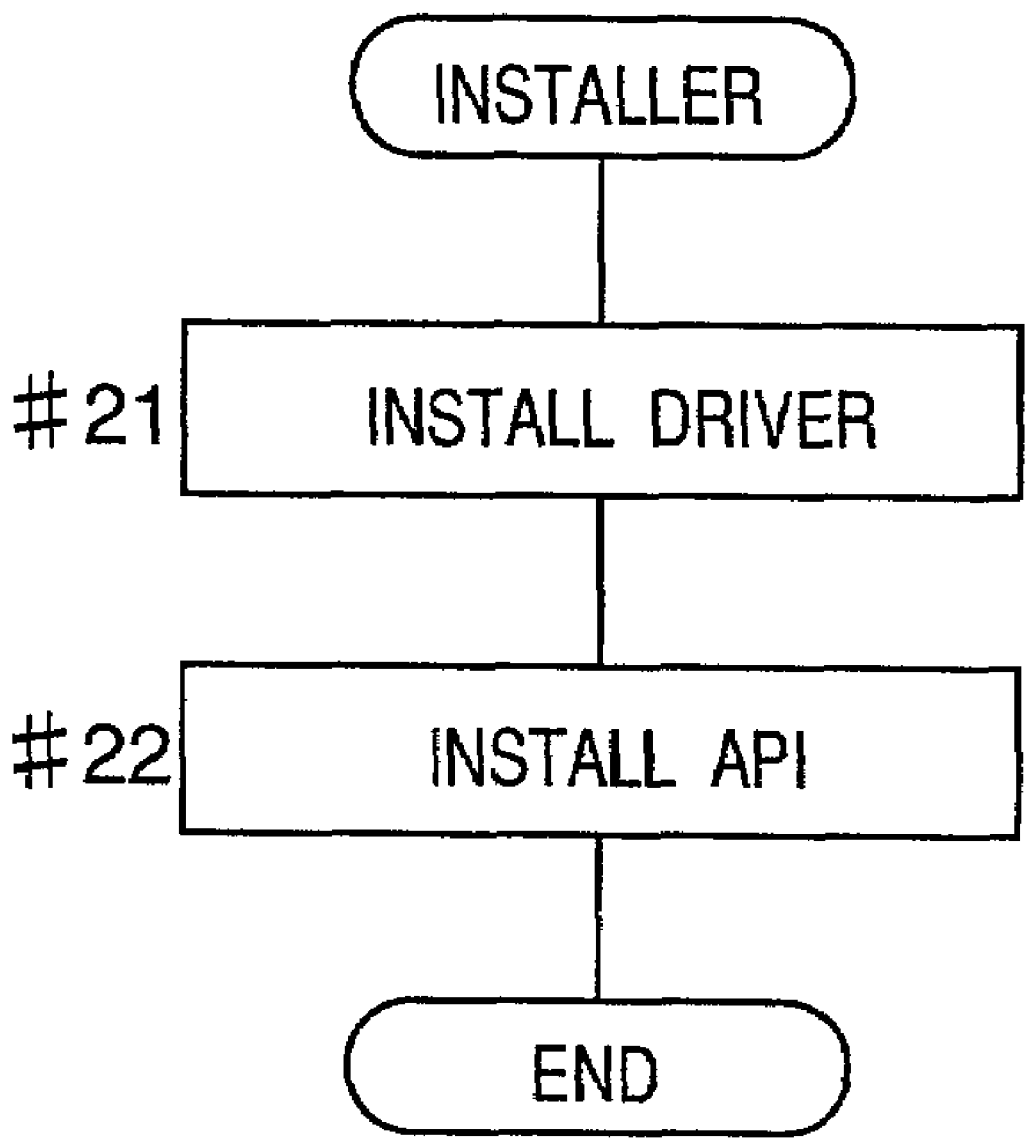
FIG. 4 is a flow chart of printer driver and API installation by an installer.

FIG. 4 is a flow chart of printer driver 3 and API 4 installation by an installer. This installation procedure first installs printer driver 3 to the client computer 10 (#21), and then installs the API 4 (#22). It will also be obvious that these steps can be reversed, or accomplished in parallel.

Embodiment 2

Figure 5:
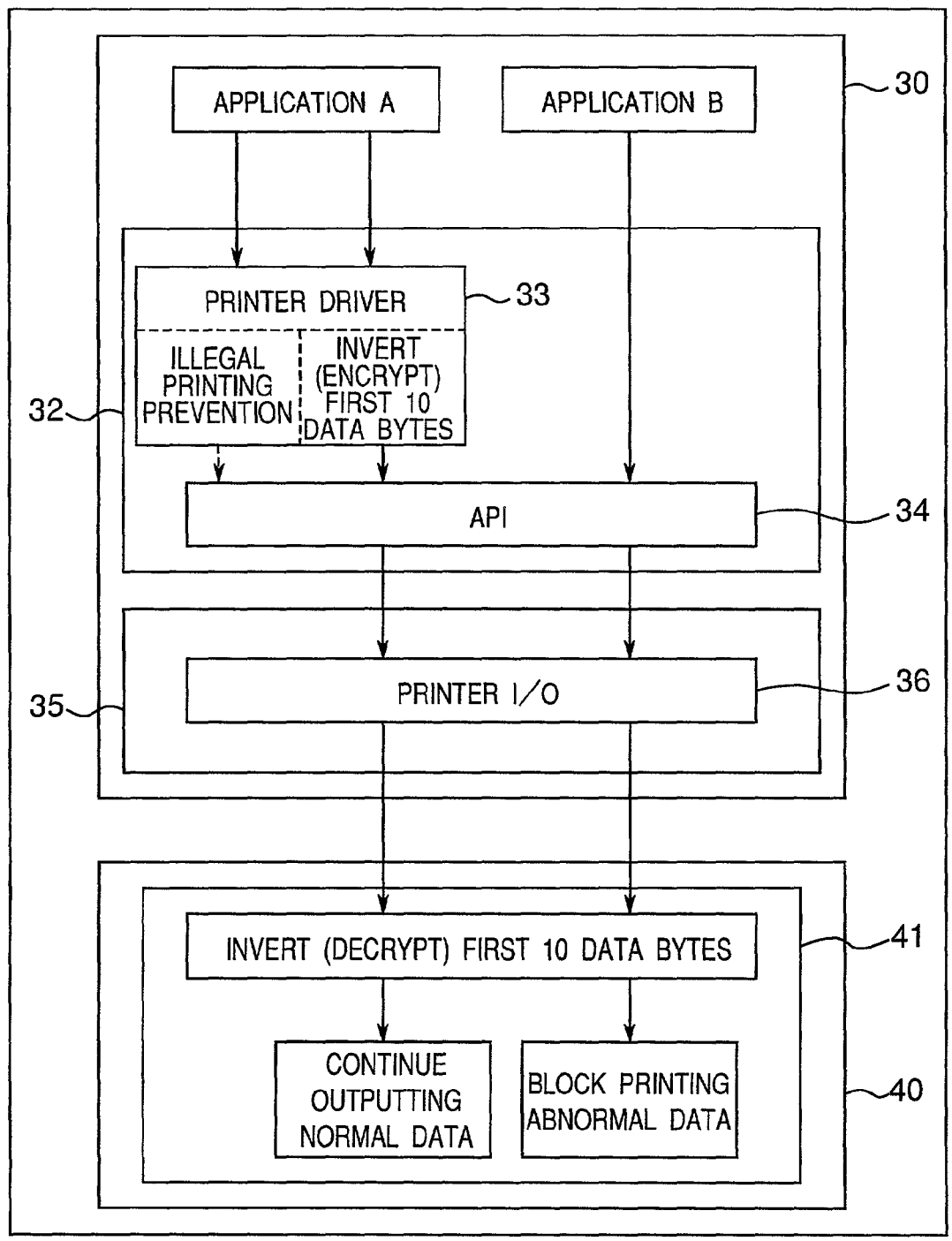
FIG. 5 is a schematic diagram of an output system according to a second preferred embodiment of the present invention.

FIG. 5 shows the configuration of an output system according to a second preferred embodiment of the invention. Similarly to the above-described first embodiment, this output system comprises a computer 30 containing an operating system (OS) 32 and hardware 35, the operation of which is based on control data from the OS 32, and a printer 40 connected to the computer 30. The OS 32 has a printer driver 33 for controlling the printer 40 as one of the device drivers installed thereto. A part of OS 32 also is provided for an application programming interface (API) 34 through which printing functions under OS 32 are called in response to a print request from an application program ("APPLICATION A" and "APPLICATION B" shown in FIG. 5).

The printer driver 33 can prevent illegal printing when generating print data, and can refuse access to the printer 40 by any received illegal data. The printer driver 33 also has an encrypting function for inverting the first 10 bytes of data during legal printing tasks, that is, when legal data that is allowed to be printed is received.

Data that has passed or bypassed this printer driver 33 is input to the printer I/O section 36 of the hardware 35, and converted to and then sent in a format suitable for transmission to the printer 40.

Corresponding to the encrypting function of data inversion by printer driver 33, the controller 41 built into the printer 40 has a decrypting function (data inverting function) for inverting the first 10 bytes of data in the data sent from the computer 30. The printer 40 prints out normal data after this data inversion by the decrypting function, and interrupts output for abnormal data. Note that as used herein "normal data" refers to the data restored to the original format after the data encrypted by the computer 30 is reverted to the original unencrypted state by the printer 40, and "abnormal data" refers to data that bypasses the printer driver 33 and has the data bits inverted on printer 40 as described above.

An output system according to this second embodiment can thus prevent output of illegal data that has passed the printer driver 33 by means of the illegal printing prevention function. This output system can also prevent illegal printing when data bypasses the printer driver 33 as a result of the decryption function of the printer controller 41 inverting the first 10 bytes of print data and thus converting it to abnormal data.

Figure 6:
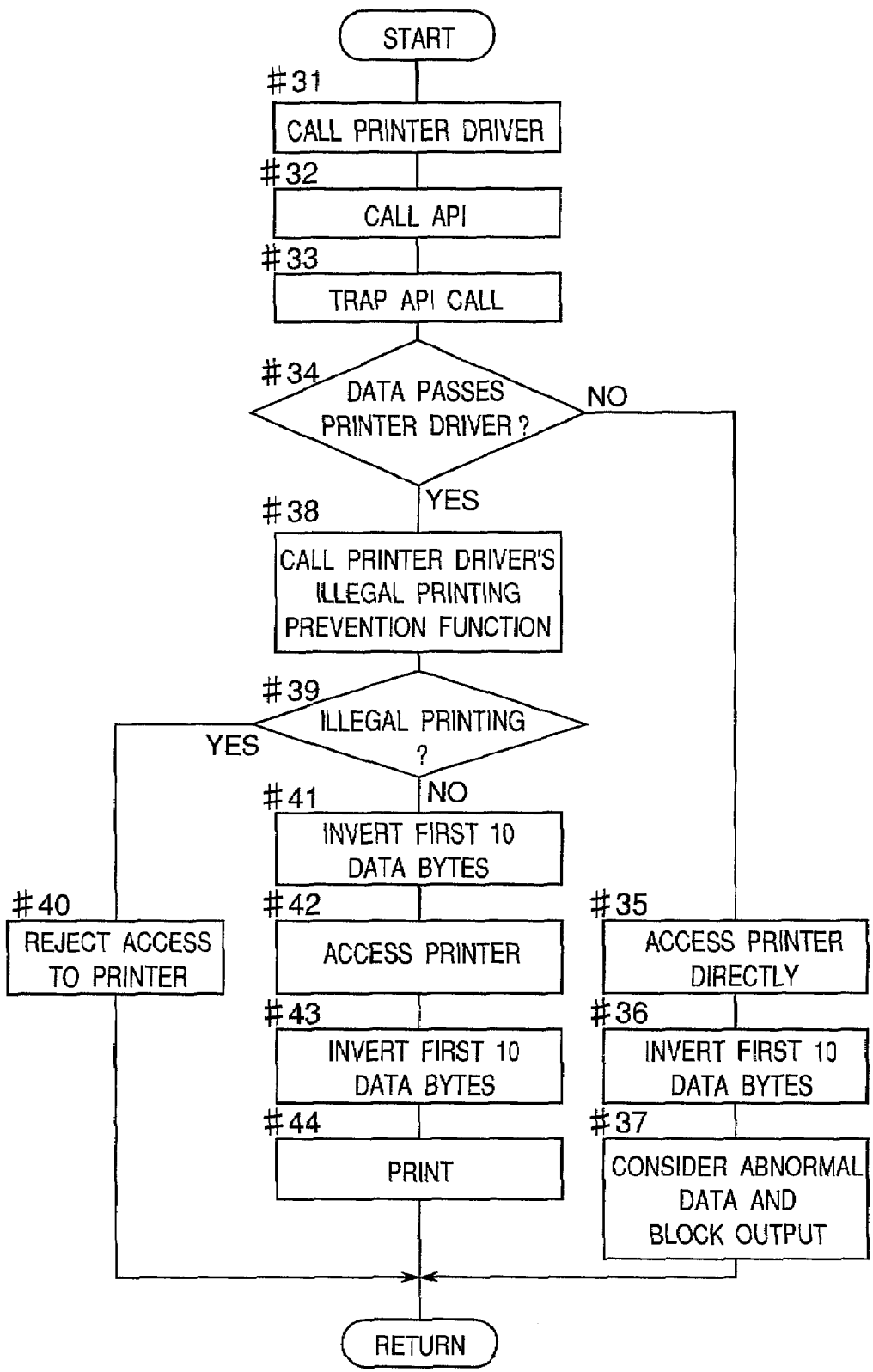
FIG. 6 is a flow chart of the illegal printing prevention operation of the output system in FIG. 5.

FIG. 6 is a flow chart of the illegal printing prevention operation of an output system according to this preferred embodiment.

When an application program issues a print request, the printer driver 33 is called (#31) and the API 34 is called (#32). API calls indicating a print request are trapped (#33). In step #34, it is determined, based on the API call, whether a data path through the printer driver 33 is requested. If not, the procedure advances to step #35, and on the other hand, if the data is sent through printer driver 33, the procedure advances to step #38.

The printer 40 is directly accessed in step #35. In step #36, the first 10 bytes are then inverted on printer 40. The print data is therefore detected to be abnormal data (#37), output is interrupted, and the process ends.

In step #38, the illegal printing prevention function of the printer driver 33 is called. In step #39, it is determined whether illegal printing is requested, that is, whether the data to be printed is illegal data. If illegal printing is requested, the procedure advances to step #40, printer access is rejected, and the process ends. On the other hand, if illegal printing is not requested, the procedure advances to step #41, the first 10 bytes of data are inverted, and the printer 40 is accessed (#42).

In step #43, the first 10 bytes of data is inverted on printer 40. Thus, the 10 bytes inverted by the printer driver 33 are again inverted, restoring the data to the original normal print data. This data is then printed (#44), and the print job is output.

It will thus be obvious that an output system according to this preferred embodiment of the invention can prevent illegal printing when data is passed through printer driver 33 and when data bypasses printer driver 33.

It should be noted that this second embodiment of the invention simply inverts the first 10 bytes of data passing through the printer driver 33 to achieve the data encrypting means whereby the illegal printing prevention function is achieved. The invention will obviously not be so limited, however, as other encrypting methods can be used. For example, a password could be applied to data passing printer driver 33. In this case, a program for identifying a password and discriminating valid print data must be provided on printer 40 side for data decryption.

As will be known from the preceding explanation, this second preferred embodiment of the invention achieves an output system that can prevent illegal printing with high reliability and at a low cost using software, and thus does not require additional hardware expenditures. Furthermore, because the illegal printing prevention technology is built into printer driver 33, updating the printer driver is simple. It is therefore simple to modify the printer driver to keep the illegal printing prevention technology current with new types of illegal printing data such as when new currency is introduced.

Furthermore, because preventing illegal printing is achieved in this second embodiment by incorporating a decryption program into the printer hardware, cost increments can be avoided and a relatively high security system can be assured.

Embodiment 3

Figure 7:
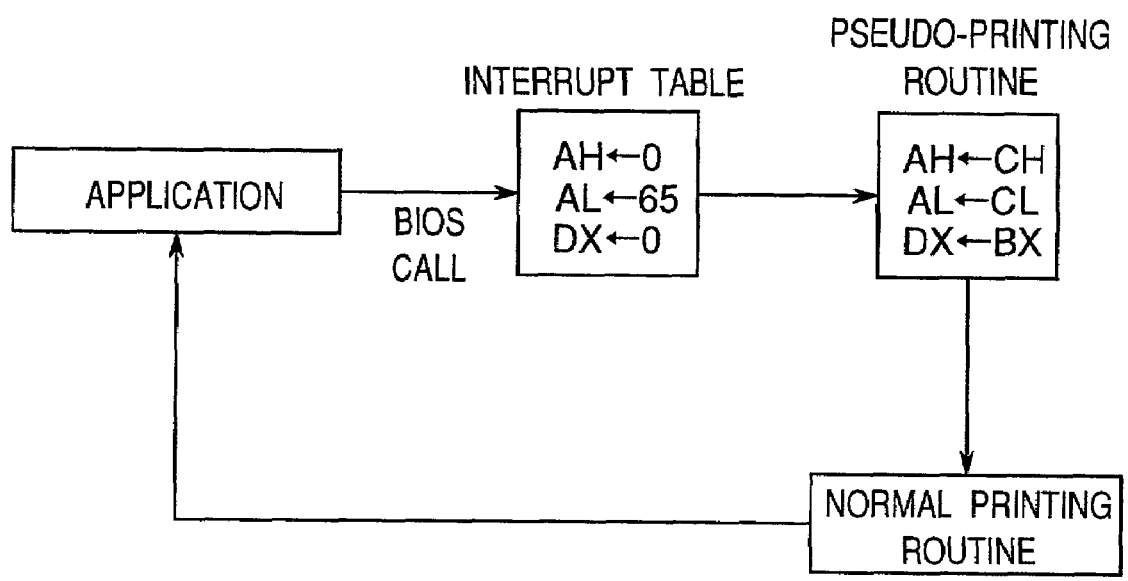
FIG. 7 is a flow chart of data flow in a output system according to a third preferred embodiment of the present invention operating under the MS-DOS operating system.

A third embodiment of the invention is described next with reference to FIG. 7 to FIG. 10 using MS-DOS (R) as the operating system installed to the computer. FIG. 7 shows the typical data flow when outputting data to a printer in an MS-DOS system.

In this MS-DOS system, the output system is changed, as the value of content to be set to specific register (AH, AL, DX registers) is set to one that is different from the ordinary value for normal printing, for print commands issued in response to a print request from an application program ("APPLICATION" in FIG.7). In result, different registers are used practically, thus sending data to the printer is prohibited, and all normal print operations are thus prohibited.

Figure 8:
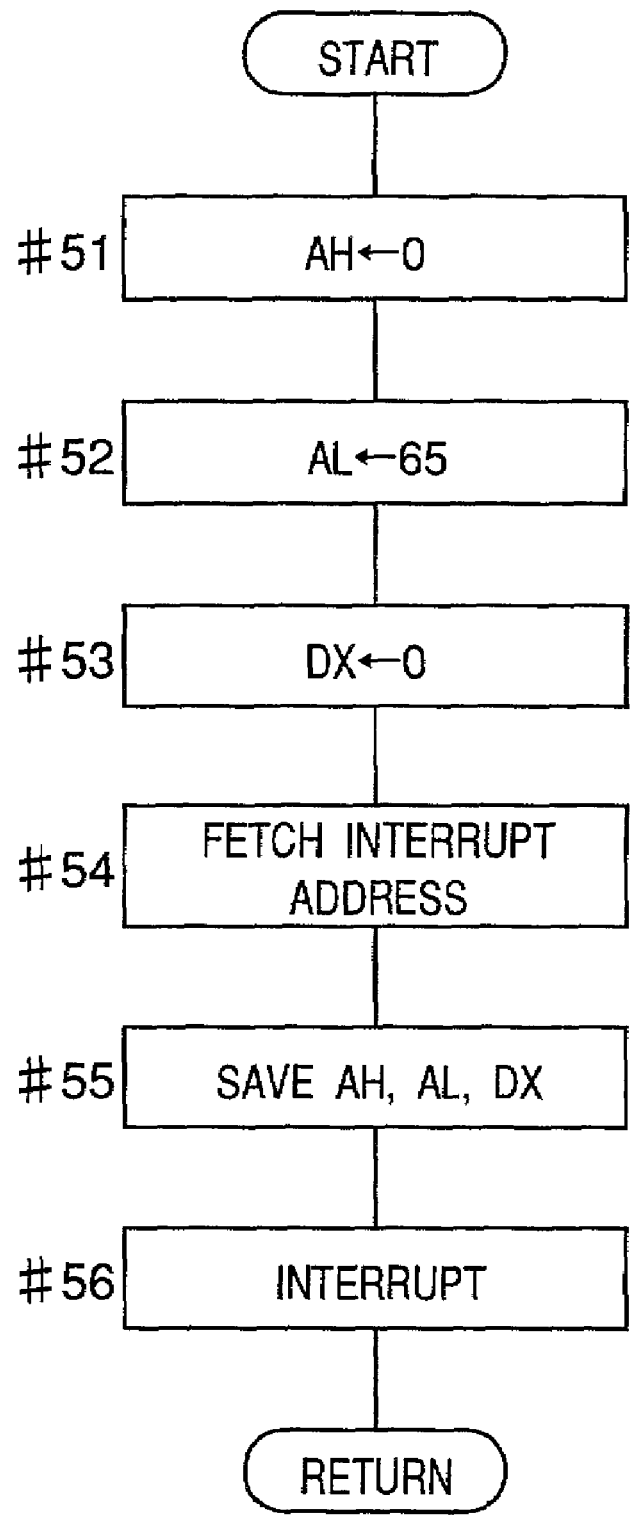
FIG. 8 is a flow chart of a typical data processing operation under the MS-DOS operating system.

The data process normally used in an MS-DOS system is described next with reference to FIG. 8. In of an MS-DOS system, a BIOS interrupt table is set during the startup procedure. Data to be printed in response to a request from an application is sent to the printer in the form of a BIOS interrupt call. In this case, when the application requires to print the letter A, 0 is stored to register AH (#51), data 65 equivalent to letter A is stored to register AL (#52), the destination printer number is stored to register DX (#53), and an INT 17 command is issued as the interrupt command.

When the CPU receives the INT 17 command, it fetches the 17th address (e.g., data stored in the four bytes starting from the address "0000:005c") from the interrupt table (#54). The CPU then creates a stack frame, saves the register in that frame (#55), jumps to that address, and executes an interrupt (#56). Because the address jumped to is the address for conventional printer control, control returns to the application when a return command is issued after the data is sent to the printer.

Figure 9:
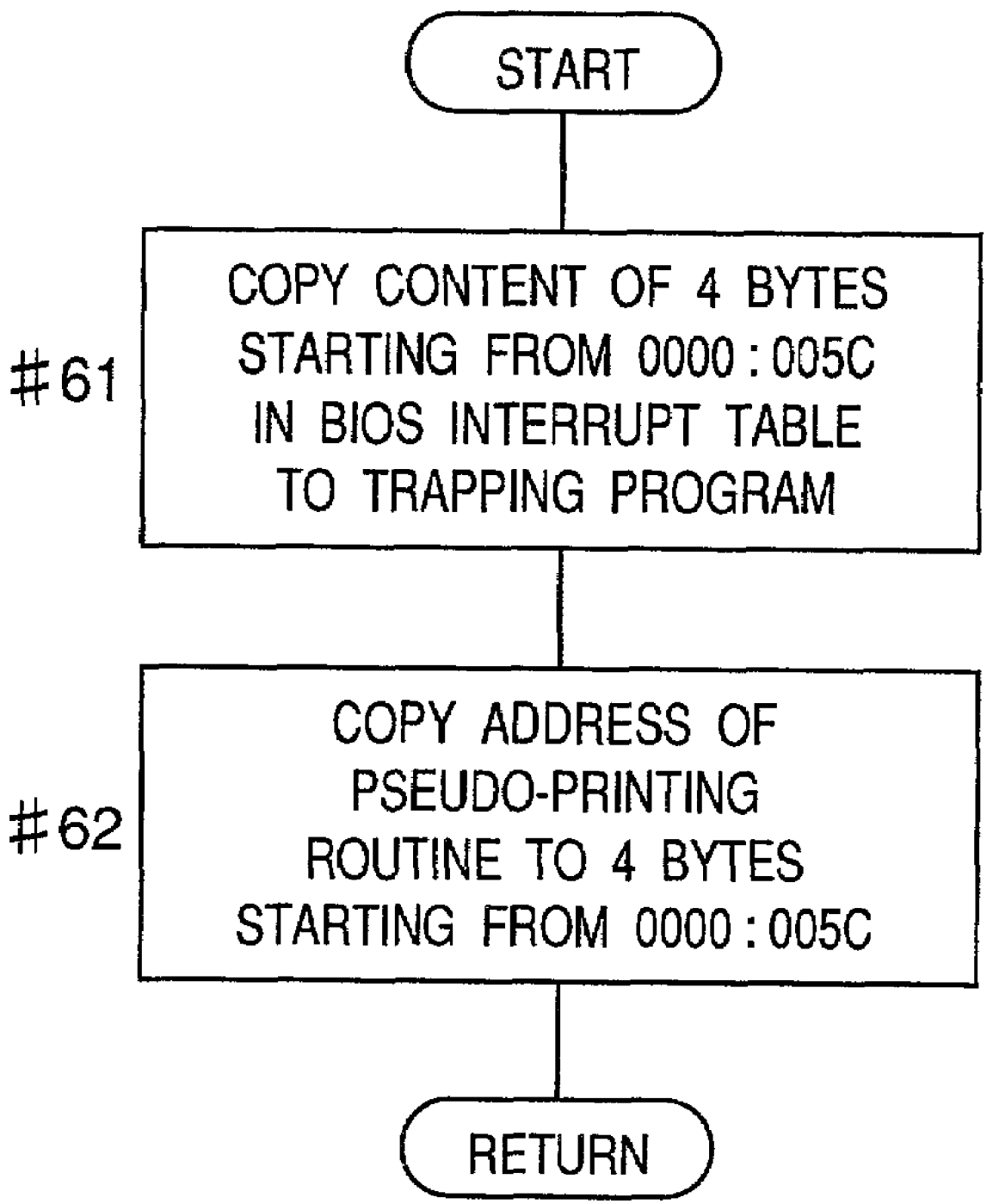
FIG. 9 is a flow chart of a trapping process in the third preferred embodiment of the invention.

FIG. 9 is a flow chart of a trapping process according to this third embodiment of the invention.

A trap program that runs automatically during the startup process copies the content of the four bytes starting from address 0000:005c in the BIOS interrupt table are copied to the trap program (#61). The address of a pseudo-printing routine in the trap program is then copied to the four bytes starting from "0000:005c" (#62), and the process ends with the trap program being left in memory.

Figure 10:
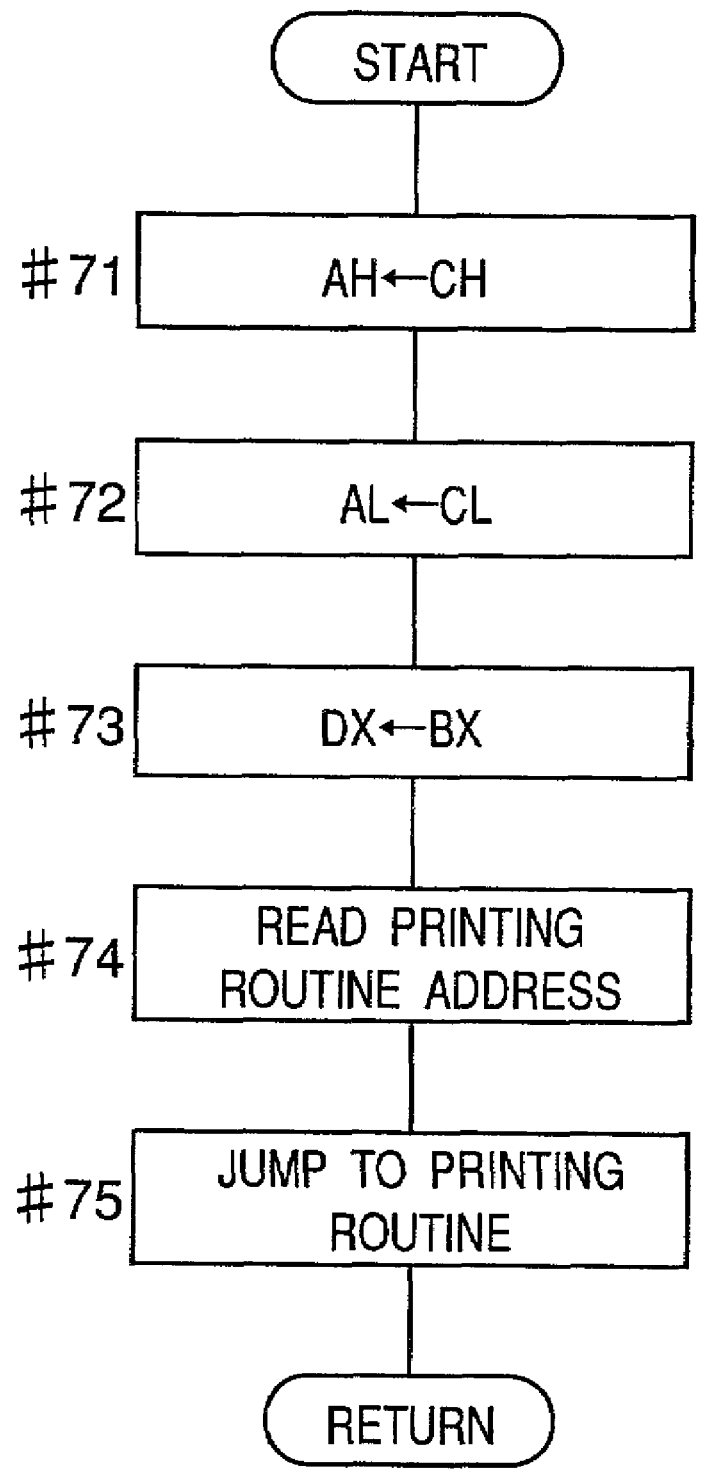
FIG. 10 is a flow chart of a pseudo-printing routine according to the third preferred embodiment of the invention.

Operation of this pseudo-printing routine is described next with reference to FIG. 10.

In this pseudo-printing routine the content of register CH is copied to register AH (#71), the content of register CL to register AL (#72), and the content of register BX to register DX (#73). The print routine address is then read (#74), and control then skips to the address of the print routine copied into the trap program (#75). From the perspective of the application the print command is changed from using registers AH, AL, and DX to using register CH, CL, and BX. In result, normal printing operations cannot be accomplished.

This pseudo-printing routine also monitors the printer control IC ports so that when a busy signal occurs even though no data is sent, the pseudo-printing routine sends a printer IC initialization command as an error handling measure.

Because the printer driver thus uses registers CH, CL, BX, only applications that use this printer driver are able to print. Furthermore, when data is sent directly to the printer control IC bypassing the BIOS, the printer driver resets the printer control IC and thus prevents illegal printing.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An output method used in an output system having a data processing device and an output device for outputting data in a specific format, which is sent from the data processing device, comprising:

determining whether a print request instructs data to be directly sent to the output device so as to bypass driver software incorporated in the data processing device; and prohibiting data from being sent to the output device if said print request instructs data to be sent to the output device so as to bypass the driver software.

2. The method of claim 1, wherein said determining step distinguishes between data that is sent to the output device via said driver software and data that bypasses said driver software, and wherein said prohibiting step is only performed with respect to data that bypasses the driver software.

3. An output system having a data processing device and an output device for outputting data in a specific format, which is sent from the data processing device, driver software for controlling the output device being included in the data processing device, and comprising:

a first controller for receiving a print request and determining whether the print request instructs data to be sent to the output device via the driver software or to be directly sent to the output device so as to bypass the driver software; and a second controller responsive to said first controller for calling an illegal printing preventing function incorporated into the driver software if said print request instructs data to be sent to the output device via the driver software, and for prohibiting said data from being sent to the output device if said print request instructs data to be sent to the output device so as to bypass the driver software.

4. A computer-readable storage medium for storing a program run on an output system having a data processing device and an output device for outputting in a specific format data sent from the data processing device, said program comprising steps of:

determining whether a print request instructs data to be directly sent to the output device so as to bypass driver software incorporated in the data processing device; and prohibiting data from being sent to the output device if said print request instructs data to be sent to the output device so as to bypass the driver software.

5. The computer-readable storage medium of claim 4, wherein said determining step distinguishes between data that is sent to the output device via said driver software and data that bypasses said driver software, and wherein said prohibiting step is only performed with respect to data that bypasses the driver software.

* * * * *